United States Patent [19]

Brekke

[11] 4,366,973

[45] Jan. 4, 1983

[54] ROTATING PIPE COUPLING

[76] Inventor: Carroll E. Brekke, 2229 Parkland Way, Petaluma, Calif. 94952

[21] Appl. No.: 883,729

[22] Filed: Mar. 6, 1978

[51] Int. Cl.³ .............................................. F16L 27/08
[52] U.S. Cl. ..................................... 285/276; 285/281
[58] Field of Search ............... 285/276, 275, 281, 134, 285/348

[56] References Cited

U.S. PATENT DOCUMENTS

| 1,629,650 | 5/1927 | Brauer | 285/281 X |
| 1,746,036 | 2/1930 | Gray | 285/275 X |
| 1,928,076 | 9/1933 | Rudolph | 285/281 |
| 2,331,615 | 10/1943 | Meyer | 285/276 |
| 2,384,360 | 9/1945 | Allen et al. | 285/276 X |
| 2,394,715 | 2/1946 | Phillips | 285/276 X |
| 2,723,136 | 11/1955 | Deubler | 285/276 X |
| 2,927,804 | 3/1960 | Snyder et al. | 285/276 X |
| 2,964,340 | 12/1960 | Kinzie et al. | 285/276 X |
| 3,002,769 | 10/1961 | Deubler et al. | 285/276 X |
| 3,301,567 | 1/1967 | Barr | 285/348 X |
| 3,420,555 | 1/1969 | Faccou | 285/276 |

Primary Examiner—Thomas F. Callaghan

[57] ABSTRACT

A rotating union wherein an inner cylindrical tube fits within an outer coaxial cylindrical tube. First and second bearings are between the tubes with the first bearing being closer to the end of the outer tube. The first bearing is attached to absorb substantially all expansive axial forces imposed between the tubes. The second bearing is generally spaced from the first bearing. The second bearing is attached for absorbing substantially only radial forces imposed on the tubes. Packing is axially compressed between the tubes to provie radial expansion sealing therebetween. A structure is provided which accomplishes, in certain embodiments, adjustable axial compressing of the packing from the exterior of the outer tube. The axial compressing in all embodiments is preferably spaced from and non-communicating with the inner tube.

31 Claims, 5 Drawing Figures

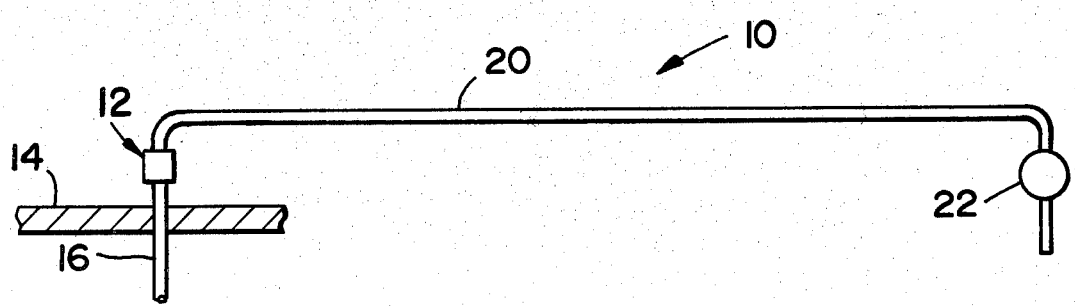
FIG_1
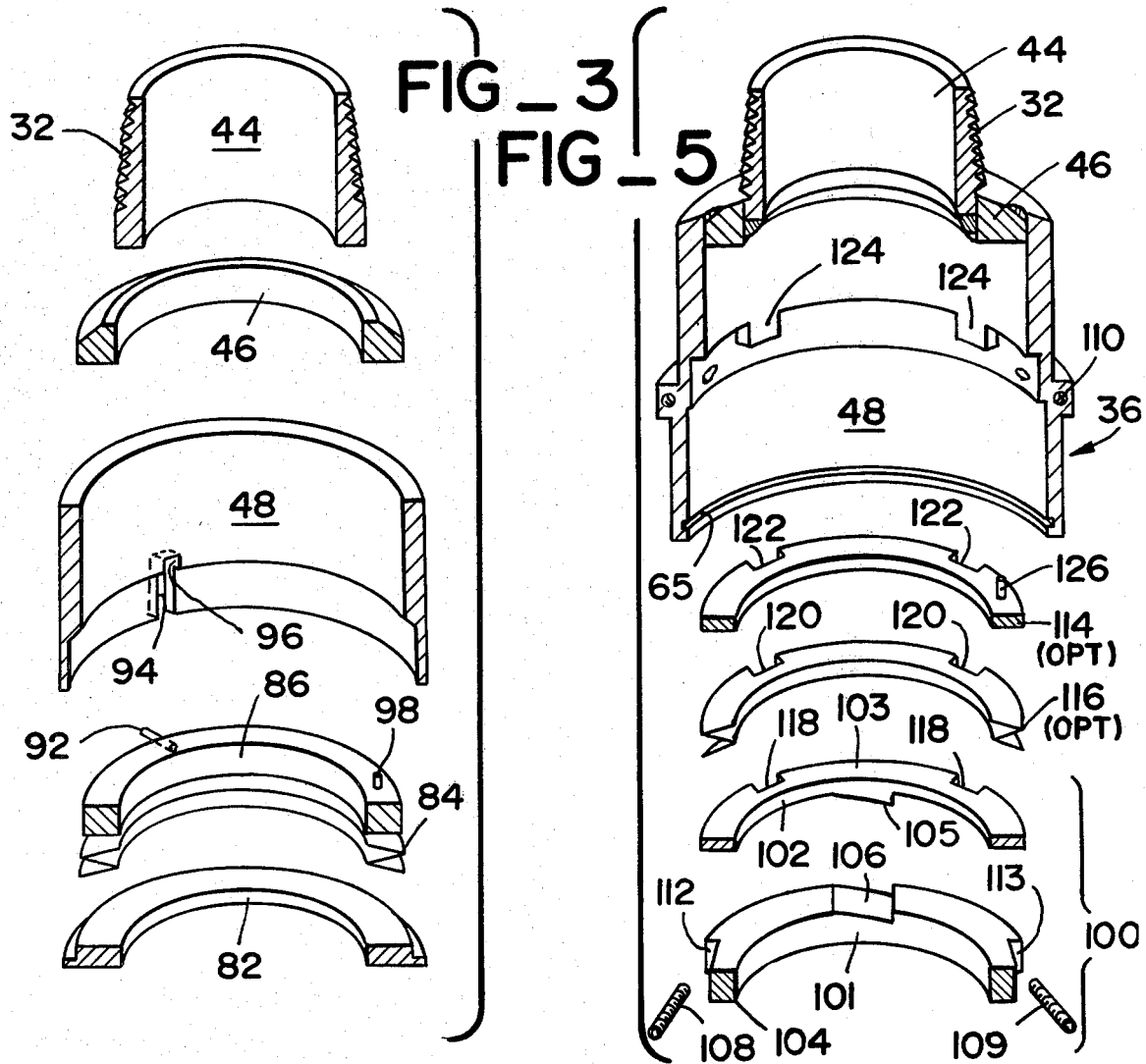
FIG_3 FIG_5

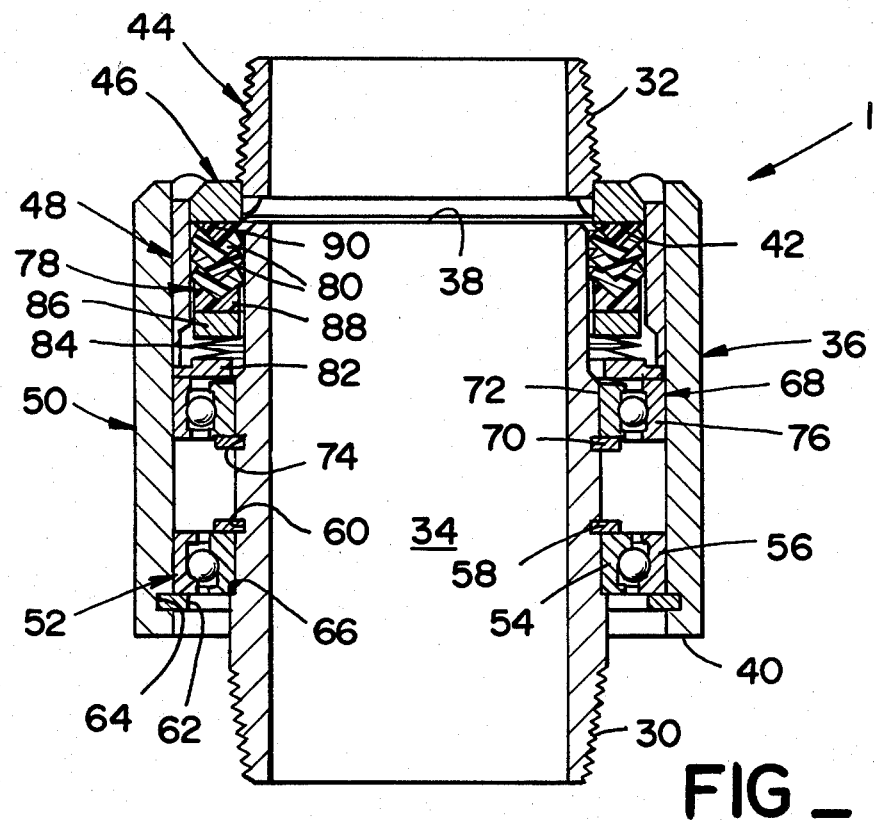
FIG_2
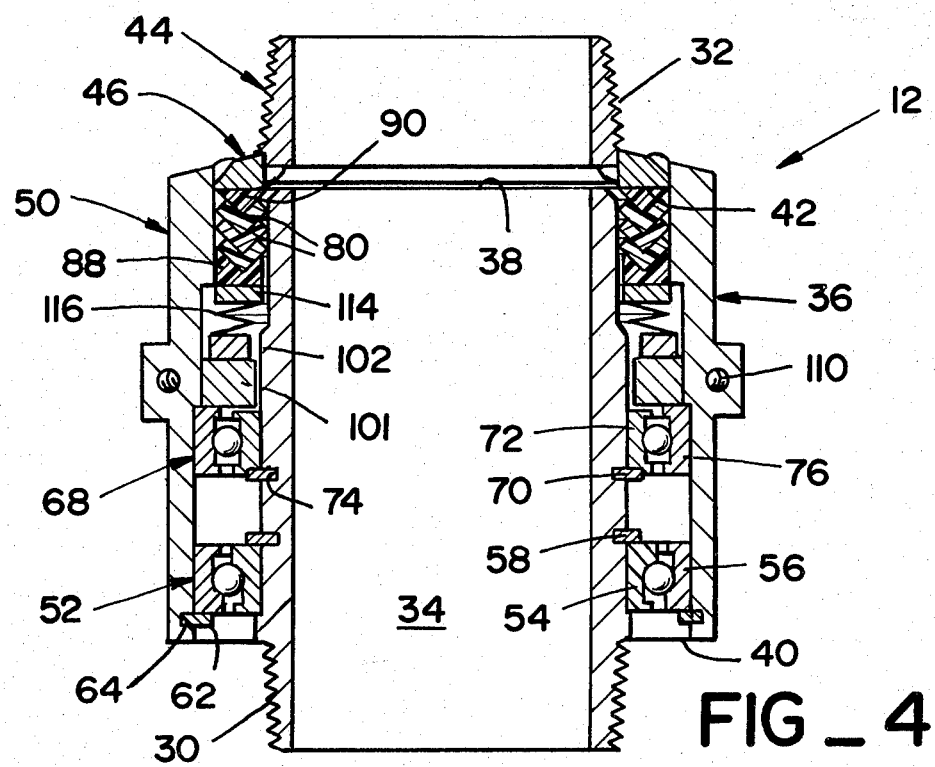
FIG_4

ROTATING PIPE COUPLING

BACKGROUND OF THE INVENTION

1. Field of the Invention

The invention relates to rotating unions such as are used in loading fluids from manufacturing or storing facilities into railroad tank cars, tank trucks and the like. Such unions are referred to in the trade as swivel joints and must be leak proof as well as being fully rotatable to adjust for a variety of loading operations.

2. Prior Art

Rotating unions of swivel joints as they are often referred to are used for loading fluids from storage or manufacturing facilities to railroad tank cars, tank trucks, tanker ships and the like. A serious problem with the prior art units has been that they take a good deal of time to disassemble and reassemble when the packing used therein needs replacement. Thus, it often takes over one and one-half hours to replace worn packing rings in the most common existing swivel joint units. Such swivel joint units generally have machined ball-bearing raceways as an integral part of an outer cylindrical member and of an inner cylindrical member. Grease laden balls are individually removed via a typical small threaded port plug which is itself part of the raceway. Since the port plug is part of the raceway it is itself subjected to radial loading. Also, the axial thrust raceway arc creates a circumferential discontinuity at the ball loading ports. The ball loading ports are normally made as small as possible to minimize the arc of the circumferential raceway discontinuity thus making loading of clean balls difficult and the removal of grease laden balls quite arduous, and, since there are usually well over fifty balls present, quite time consuming also. Further, machining imperfections and/or grains of sand or other abrasive materials in the threads of the port plug can cause improper seating thereof so that every ball rolling over the discontinuity during operational swivel rotation is subjected to potential surface damage.

Because the ball-bearing raceways of the most common existing units are machined into the outer tube and the inner tube, the raceways must be hardened; but, this creates brittle portions thereof and introduces potential metal thermal stress problems.

still another problem with the prior art designs of this nature is that the two ball-bearing raceways which are machined into the inner and outer tubes and are spaced from one another must both be capable of bearing both high axial thrust and high radial thrust. Yet, when such swivels are used to transport liquids and are attached to heavy lengthy pipes where the swivel must support a load with a high bending moment at the rotating swivel with liquid flowing through at little or no pressure, a high radial load bearing is desirable but only low axial load capabilities are needed. Equally frequently, however, a swivel may be required to transport a high pressure liquid in a system with little or no bending moment. In such a use high axial thrust bearing having a low radial load is best suited. Existing commercial swivels cannot offer this versatility and instead make use of a pair of ball-bearing units spaced apart from one another, each of which is capable of both high axial thrust bearing and high radial thrust bearing.

Another problem yet with prior art swivel joints is that uniform compression of the packing to cause the packing to radially expand into sealing relation with the inner and outer tubes is not usually adequately attained. The prior art devices generally use a plurality of small coil springs equally spaced about the inner tube and compressing the packing axially between the inner tube and the outer tube. Besides providing insufficiently uniform distribution of the compression, such individual coil springs do not generally provide as great a compression as is desirable in certain operations. Still further, removal and replacement of a number of tiny coil springs is difficult and time consuming. Yet further, the packing often rotates relative to the coil springs in existing swivels. This action destroys the axial coil spring alignment or breaks or damages the coil springs so severely they become non-functional.

Rotary fluid joints have been designed which utilize a pair of ball-bearing units which are held in place by snap rings or the like whereby some of the above-mentioned problems are solved. Such units are disclosed for example in U.S. Pat. No. 2,723,136 and in U.S. Pat. No. 3,889,983. However, in such prior art rotary fluid joints each of the ball-bearing units has borne both a radial and an axial load with axial load being transferred from one ball-bearing unit to the next. Further, the prior art units of this nature have not been such as to exert pressure uniformly upon packing material, and, indeed, the sealing elements utilized have generally not been compressed between either of the ball-bearing assemblies and the tubes entering the union. Thus, the prior art has not provided an apparatus wherein especially useful and low friction bearing units can be used independently for axial and radial loading or wherein the tension upon the packing can be easily adjusted or wherein the packing is compressed between the outer tube and an outer race of the bearing structure nearest the end of the inner tube.

SUMMARY OF THE INVENTION

A rotary union is provided in accordance with the present invention wherein an outer cylindrical tube is placed coaxially about an inner tube with an end of the inner tube extending into the outer tube from an end thereof. A first bearing is provided interiorly of the outer tube and adjacent the end thereof, the first bearing being exterior of the inner tube. Removable means are provided for preventing an inner race of the first bearing from moving axially towards and end of the inner tube and removable means are provided for preventing an outer race of the first bearing from moving axially towards the end of the outer cylindrical tube. A second bearing is provided interiorly of the outer tube and exteriorly of the inner tube, the second bearing being intermediate the first bearing and the end of the inner tube and the outer races of the bearings being spaced from one another. Removable means are provided for preventing an inner race of the second bearing from moving axially away from the and of the inner tube. Packing is provided radially intermediate the inner and outer tubes adjacent the end of the inner tube and means are provided for axially compressing packing to cause it to radially expand to seal between the outer tube and an outer race of the second bearing, the axial compressing means being spaced from and not communicating with the inner race of the second bearing.

In another sense, the invention relates to an improvement in a rotating union which comprises an outer cylindrical tube, an inner cylindrical tube coaxially entering the outer tube, packing radially intermediate the tubes and bearing means mounting the tubes to one another. The improvement is utilizing first and second bearings as the bearing means with means for attaching the first bearing for absorbing substantially all expansive axial forces imposed between the tubes and means for attaching the second bearing for absorbing substantially only radial forces imposed on the tubes.

In still another sense, the invention relates to an improvement in a rotating union which comprises inner and outer coaxial cylindrical tubes, packing radially intermediate the tubes and bearing means mounting the tubes to one another. The improvement is means for axially compressing the packing between the outer tube and the bearing means comprising a compression washer and an abutting packing compression ring between the tubes and means accessible from an exterior of the outer tube for axially adjusting the distance between the non-abutting ends of the ring and washer to adjust the compression of the packing.

BRIEF DESCRIPTION OF THE DRAWINGS

The invention will be better understood by reference to the figures of the drawings wherein like numbers denote like parts throughout and wherein:

FIG. 1 illustrates schematically a rotary union in accordance with the present invention in use with a loading apparatus;

FIG. 2 illustrate in side section a first embodiment of a rotary union in accordance with the present invention;

FIG. 3 illustrates in sectional exploded view certain of the components shown in FIG. 2;

FIG. 4 illustrates in a view similar to FIG. 2 a second embodiment of a rotary union in accordance with the present invention; and FIG. 5 illustrates in exploded sectional view the embodiment shown in FIG. 4.

DETAILED DESCRIPTION OF THE PREFERRED EMBODIMENTS

FIG. 1 illustrates a loading apparatus 10 which utilizes a rotary union 12 in accordance with the present invention. Briefly, a fluid passes up through a stationary platform 14 via a loading pipe 16. The loading pipe 16 is attached to the rotating union 12. Fluid then exits the rotating union 12 via a delivery pipe 20 past a valve 22 to a vessel being loaded (not illustrated). The delivery pipe 20 can be braced if desired. As will be readily apparent the rotating union 12 is subjected to significant imposed radial and expansive axial strains since the delivery pipe 20 is often quite long and carries a full load of fluid at times thus creating a significant moment and radial load about the rotating union 12. Heavy axial strain results during high pressure fluid delivery operation. The present invention is concerned with a unique design for the rotating union 12 which makes it easily repairable and which makes axial and radial loads more easily borne by it.

First Embodiment

Adverting now to FIGS. 2 and 3, there is illustrated therein a first embodiment of the present invention. In the emobodiment of FIGS. 2 and 3 the delivery pipe 20 is bent and connected to the rotating union 12. In the particular embodiment illustrated in these figures the connection of these pipes is via threads 30 and 32 and it should be noted that the bent delivery pipe 20 can be attached to either the threads 30 or the thread 32 interchangeably. It should also be noted that if desired the loading pipe 16 and the delivery pipe 20 can simply be welded to an inner cylindrical tube 34 and an outer cylindrical tube 36 as illustrated in FIG. 2. In the embodiment illustrated in FIG. 2 and end 38 of the inner tube 34 extends into the outer tube 36 from an end 40 thereof. As will be noted from FIGS. 2 and 3 the outer tube 36 has a radially inwardly extending shoulder 42 adjacent the end 38 of the inner tube 34 for reasons which will shortly become apparent. In the particular embodiment illustrated the shoulder 42 is formed by connecting a thread portion 44 of the outer tube 36, said portion having threads 32 thereon, to an annular member 46. The annular member 46 is connected to a sleeve 48. The sleeve 48 is itself connected to a larger sleeve 50 seen in FIG. 2. All of the above connections are generally by welding as illustrated in FIG. 2. A first bearing 52, which comprises an inner race 54 and an outer race 56 and may be of the ball-bearing type as illustrated, is positioned interiorly of the outer tube 36 and exteriorly of the inner tube 34 with the first bearing 52 being adjacent the end 40 of the outer tube 36. Removable means, in the embodiment illustrated a snap ring 58, is provided for preventing the inner race 54 of the first bearing 52 from moving axially toward the end 38 of the inner tube 34. The snap ring 58 is made to fit within a conventional annular channel 60 as shown in FIG. 2. Removable means are also provided for preventing the outer race 56 of the first bearing 52 from moving axially towards the end 40 of the outer tube 36. In the embodiment illustrated the removable means for preventing axial movement of the outer race 56 of the first bearing 52 comprises again a conventional snap ring 62. The conventional snap ring 62 fits within a conventional annular channel 64 as illustrated. The races of the first bearing 52 are selected, as illustrated, to accept axial loads.

A second bearing 68 is provided interiorly of the outer tube 36 and exteriorly of the inner tube 34 with the second bearing 68 being intermediate the first bearing 52 and the end 38 of the inner tube 34. As will be noted by reference to FIG. 2 the second bearing 68 is spaced from the first bearing 52. The spacing helps to assure that axial and radial loads can be distributed unevenly between the bearing 52 and the bearing 68 although it should be realized that, if desired, the bearings can be adjacent one another so long as only the inner races of the respective bearings contact one another. Removable means, in the embodiment illustrated a snap ring 70, is provided for preventing an inner race 72 of the second bearing 68 from moving axially away from the end 38 of the inner tube 34. The races of the second bearing 68 are selected, as illustrated, to accept substantially only radial loads. In accordance with what has been said previously, the two snap rings 58 and 70 can be replaced by a single snap ring by moving the first bearing 52 to adjacent the second bearing 68. The snap ring 70 fits within a conventional annular channel 74 as do the other snap rings previously discussed.

An outer race 76 of the second bearing 68 communicates with packing 78, generally in the form of a plurality of chevron shaped packing elements 80 in an advantageous manner as will be briefly explained in following. The packing 78 is positioned radially intermediate the inner tube 34 and the outer tube 36 and adjacent the end 38 of the inner tube 34. Means are provided for axially compressing the packing between the outer tube 36 and the outer race 76 of the second bearing 68 to cause the packing 78 to form a radial expansion seal between the inner tube 34 and the outer tube 36. The axial compressing means is spaced from and does not communicate with the inner race 72 of the second bearing 68. This is advantageous since it allows the second bearing 68 to be of primarily a radial load accepting variety and prevents scraping of the inner race 72 by the washer 82. The bearing 52 then can be made primarily axial load accepting and types of bearings can be chosen for the bearings 68 and 52 which are particularly adapted for handling respectively radial and axial loads. Such bearings are conventional and are available commerically from a number of suppliers. The means for axially compressing the packing 80 comprises a washer 82 between the inner tube 34 and the outer tube 36 with the washer 82 communicating with the outer race 76 of the second bearing 68 and being spaced from the inner race 72 thereof. Annular compression spring means, in the embodiment illustrated schematically belleville washers 84, surround the inner tube 34 and are located within the outer tube 36. The compressing means are generally spaced from and do not communicate with the inner tube 34 thus greatly reducing shear stress in the packing 78 where the inner tube 34 rotates relative to the outer tube 36. This can be accomplished for example, by providing a larger clearance between the inner tube 34 and the compressing means than is provided between the outer tube 36 and the compressing means. The washers 84 supportively communicate with the washer 82 on an opposite side thereof from the second bearing 68 and also communicate with the packing 78 via a packing compression ring 86 and a chevron mating support ring 88 generally made of the same material, e.g., Nylon, as the chevrons 80. The shoulder 42 of the outer pipe 36 has in contact therewith a second chevron mating ring or adaptor 90 also generally made of the same material as the chevrons 80 and the chevrons 80 are compressed along with the chevron mating support ring 88 and the adpator 90 under the force of the belleville washers 84. The axial load placed upon the primarily radial load type beaing 68 due to the compression of the packing 78 is a weak load and, hence, axial load accepting capability of the second bearing 68 can be minimal.

It should be noted that the above-described assembly is very easy to disassemble for replacement of worn parts. For example, the various snap rings can simply be removed along with the various bearings in a matter of a matter of a few seconds. Further, the belleville washers 84, since they go all the way around the inner tube 34, exert a very even axial force upon the packing 78.

Adverting now primarily to FIG. 3, certain details in the structure of the packing compression ring 86 and the sleeve 48 prevent the packing compression ring 86 from rotating relative to the outer tube 36. Other means retard rotation of the packing 78 relative to the packing compression ring 86. In particular, the packing compression ring 86 has a radially extending dog 92 which fits within a slot 94 within the sleeve 48. Under the force of the belleville washers 84, the packing compression ring 86 is forced upwardly to the top of the slot 94 and fits within a recess 96 defined thereat. An axially extending post 98 proceeds from the packing compression ring 86 into a mating hole in the chevron mating ring 88. This prevents rotation of the chevron mating support ring 88 relative to the packing compression ring 86 and at least greatly retards rotation of the packing 78 to any slippage between the chevrons 80, the chevron mating support ring 88 and the adaptor 90. It will be noted in this regard that the chevron mating support ring 88 and the adaptor 90 are part of the overall packing 78.

It will be perhaps useful to examine a process of disassembling and assembling the rotating union 12. To disassemble the union, the snap ring 62 is removed thus allowing the entire inner tube assembly, including bearings 52 and 68, plus snap rings 70 and 58 to be removed axially outwardly relative to the outer tube 36. The snap ring 70 can of course be removed at this time as can be the second bearing 68, the washer 82, the belleville washers 84 and the packing compression ring 86 along with the packing 78. The packing can then be replaced along with the washer 82, the belleville washers 84, the packing compression ring 86 and the packing 78 within the outer tube 36. The inner tube 34 with the first bearing 52 and the second bearing 68 held in place thereon by the snap rings 58 and 70 can then be slid axially inwardly within the outer tube 36. It is clear that the entire bearing assemblies 52 and 68 can be replaced and that packing can be replaced as necessary and that this can be accomplished in a very quick manner utilizing only easily available tools. Further, it is apparent that the construction is relatively inexpensive, not requiring any machining of the inner tube 34 or the outer tube 36 other than the machining of the channels for the various snap rings.

Second Embodiment

Adverting now to FIGS. 4 and 5, there will be seen therein an alternate embodiment of the present invention which retains the advantages of the previous embodiment and also allows adjustment of the compression of the packing 78 without disassembly of the rotating union 12. Further, as will become apparent it is not necessary in the embodiment of FIGS. 4 and 5 to make use of any type of springs for compressing the packing 78 although such springs may optionally be used. Instead, an adjustable compression means of a camming nature is provided which is accessible from the exterior of the outer tube 36 to accomplish the desired compression.

In the embodiment of FIGS. 4 and 5 compressing means 100 are provided which comprise a compression washer 101 which supportively communicates with the outer race 76 of the second bearing 68 and is spaced from the inner race 72 thereof. A packing compression ring 102 is located intermediate and in supportive contact with the compression washer 101 and with the packing 78. The compression means 100 then comprises means for axially expanding the distance between a packing facing end 103 of the packing compression ring 102 and a non-packing facing end 104 of the compression washer 101. In the particular embodiment illustrated, the axial expanding means comprises annular cam means supported by either the compression washer 101 or the packing compression ring 102 along with annular cam follower means, supported by the other of the compression washer 101 and the packing compression ring 102, which receive the cam means. Adverting particularly to FIG. 5, the cam means is shown as a plurality of wedges 105 extending from the packing compression ring 102 axially towards the compression washer 101. The cam follower means comprises a plurality of wedge shaped cavities 106 in the compression washer 101 positioned to receive the wedges 105. A plurality of set screws 108, 109, at least one of which is aligned to oppose another; are provided which screw into appropriate threaded bores 110 in the large sleeve 50, with the bores 110 being adjacent the compression washer 101. In brief, the set screws 108, 109 screw against a flat surface 112 or 113 in the outer periphery of the compression washer 101. This provides axial movement of the packing compression ring 102 towards or away from the packing 78 and allows such adjustment to be made from the exterior of the outer tube 36.

Optionally, a supplemental compression washer 114 can be utilized along with belleville washers 116. In this embodiment, the belleville washers 116 are located between the packing compression ring 102 and the supplemental compression washer 114. The packing compression ring 102, the belleville washers 116 and the supplemental compression washer 114 each have equally spaced, e.g., 120°, notches 118, 120 and 122 respectively for mating with axially extending ridges 124 formed interiorly on the outer tube 36 whereby rotation of the packing compression ring 102, the belleville washers 116 and the supplemental compression washer 114 relative to the outer tube 36 is prevented. A post 126 extends axially from the supplemental compression washer 114 into a mating hole in the packing 78, more particularly in the chevron mating support ring 88, to retard rotation of the packing 78 relative to the outer tube 36.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A rotating pipe coupling, comprising:
an inner cylindrical tube;
an outer cylindrical tube coaxially placed about said inner tube with an end of said inner tube extending into said outer tube from an end thereof;
a first bearing interiorly of said outer tube and adajcent said end thereof, said first bearing being exterior of said inner tube;
removable means for preventing an inner race of said first bearing from moving axially toward said end of said inner tube;
removable means for preventing an outer race of said first bearing from moving axially toward the end of said outer cylindrical tube, said outer race communicating only with said outer cylindrical tube and said removable preventing means therefor whereby said first bearing is attached to said inner and outer tubes for absorbing substantially all expansive axial forces imposed therebetween;
a second bearing interiorly of said outer tube and exteriorly of said inner tube, said second bearing being intermediate said first bearing and said end of said inner tube and the outer race of said second bearing being spaced to be from and out of communication with the outer race of said first bearing;
removable means for preventing an inner race of said second bearing from moving axially away from said end of said inner tube, said inner race communicating only with said inner cylindrical tube and said removable preventing means therefor whereby said second bearing is attached to said inner and outer tubes for absorbing substantially only radial forces imposed therebetween;
packing radially intermediate said inner and outer tubes adjacent said end of said inner tube; and
means for axially compressing said packing to produce radial expansion sealing between said outer tube and an outer race of said second bearing, said axial compressing means being spaced from and not communicating with said inner race of said second bearing.

2. A rotating pipe coupling as in claim 1, wherein said axial compression means comprises:
a washer between said inner and outer tubes supportively communicating with the outer race of said second bearing and spaced from the inner race thereof; and
annular compression spring means surrounding said inner tube and within said outer tube, said spring means supportively communicating with said washer on an opposite side thereof from said second bearing and with said packing.

3. A rotating pipe coupling as in claim 2, wherein said annular spring means comprises a plurality of belleville washers and said compressing means further comprises:
a packing compression ring intermediate said belleville washers and said packing;
means for preventing said packing compression ring from rotating relative to said outer tube; and
means for retarding rotation of said packing relative to said packing compression ring.

4. A rotating pipe coupling as in claim 3, wherein said rotation preventing means comprises a radially extending dog on one of said outer tube and said packing compression ring and an axially extending mating slot on the other thereof and said rotating retarding means comprises an axially extending post proceeding from said packing compression ring into said packing.

5. A rotating pipe coupling as in claim 1, wherein said outer tube includes a radially inwardly extending shoulder adjacent said end of said inner tube and said packing is compressed between said shoulder and said compressing means.

6. A rotating pipe coupling as in claim 5, wherein said axial compression means comprises:
a washer between said inner and outer tubes supportively communicating with the outer race of said second bearing and spaced from an inner race thereof;
annular compression spring means surrounding said inner tube and within said outer tube, said spring means supportively communicating with said washer on an opposite side thereof from said second bearing and with said packing.

7. A rotating pipe coupling as in claim 6, wherein said annular spring means comprises a plurality of belleville washers and said compressing means further comprises:
a packing compression ring intermediate said belleville washers and said packing;
means for preventing said packing compression ring from rotating relative to said outer tube; and
means for retarding rotation of said packing relative to said packing compression ring.

8. A rotating pipe coupling as in claim 7, wherein said rotating preventing means comprises a radially extending dog on one of said outer tube and said packing compression ring and an axially extending mating slot on the other thereof and said rotation retarding means comprises an axially extending post proceeding from said packing compression ring into said packing.

9. A rotating pipe coupling as in claim 1, wherein said axial compression means comprises:

a compression washer between said inner and outer tubes supportively communicating with the outer race of said second bearing and spaced from the inner race thereof;
a packing compression ring intermediate and in supportive contact with said compression washer and said packing; and
means for axially expanding the distance between a packing facing end of said packing compression ring and a non-packing facing end of said compression washer.

10. A rotating pipe coupling as in claim 9, wherein said axially expanding means comprises:
annular cam means supported by either said compression washer or said packing compression ring and extending towards the other thereof;
annular cam follower means supported by the other of said compression washer of said packing compression ring and receiving said cam means; and
means for relatively rotating said cam means and cam follower means for adjusting the distance between said packing facing end of said packing compression ring and said non-packing facing end of said compression washer.

11. A rotating pipe coupling as in claim 10, wherein said relative rotating means comprises at least one set screw in said outer tube positioned where an end thereof provides a generally tangential force against either said compression washer or said packing compression ring.

12. A rotating pipe coupling as in claim 11, wherein said cam means comprises a plurality of wedges on said packing compression ring extending towards said compression washer, said cam follower means comprises a plurality of wedge shaped cavities in said compression washer positioned to receive said wedges and including:
a supplemental compression washer between said packing compression ring and said packing; and
annular compression spring means surrounding said inner tube and within said outer tube, said spring means exerting an expansion force between said packing compression ring and said supplemental packing compression washer.

13. A rotating cam pipe coupling as in claim 12, wherein said set screw bears against said compression washer.

14. A rotating pipe coupling as in claim 12, including:
means for preventing said supplemental packing compression washer from rotating relative to said outer tube; and
means for retarding rotation of said packing relative to said supplemental packing compression washer.

15. A rotating pipe coupling as in claim 14, wherein said rotation preventing means comprises a plurality of notches peripherally in said supplemental packing compression ring and a corresponding plurality of mating axially extending ridges interiorly on said outer tube and said rotation retarding means comprises an axially extending post proceeding from said supplemental packing compression washer into said packing.

16. A rotating pipe coupling as in claim 1, wherein said axial compressing means is spaced from and not in communication with said inner tube.

17. A rotating pipe coupling as in claim 5, wherein said axial compressing means comprises:
a compression washer between said inner and outer tubes supportively communicating with the outer race of said second bearing and spaced from the inner race thereof;
a packing compression ring intermediate and in supportive contact with said compression washer and said packing; and
means for axially expanding the distance between a packing facing end of said packing compression ring and a non-packing facing end of said compression washer.

18. A rotating pipe coupling as in claim 17, wherein said axially expanding means comprises:
annular cam means supported by either said compression washer or said packing compression ring extending towards the other thereof;
annular cam follower means supported by the other of said compression washer and said packing compression ring and receiving said cam means; and
means for relatively rotating said cam means and said cam follower means for adjusting the distance between said packing facing end of said packing compression ring and said non-packing facing end of said compression washer.

19. A rotating pipe coupling as in claim 18, wherein said relative rotating means comprises at least one set screw in said outer tube positioned where an end thereof provides a generally tangential force against either said compression washer or said packing compression ring.

20. A rotating pipe coupling as in claim 19, including:
a supplemental packing compression washer between said packing compression ring and said packing; and
annular compression spring means surrounding said inner tube and within said outer tube, said spring means exerting an expansion force between said packing compression ring and said supplemental packing compression washer.

21. A rotating pipe coupling as in claim 20, including:
means for preventing said supplemental packing compression washer from rotating relative to said outer tube; and
means for retarding rotation of said packing relative to said supplemental packing compression washer.

22. A rotating pipe coupling as in claim 1, wherein said first bearing is of a primarily axial load accepting variety and said second bearing is of a primarily radial load accepting variety.

23. A rotating pipe coupling, comprising:
an inner cylindrical tube;
an outer cylindrical tube coaxially placed about said inner tube with an end of said inner tube extending into said outer tube from an end thereof;
a first bearing interiorly of said outer tube and adjacent said end thereof, said first bearing being exterior of said inner tube;
removable means for preventing an inner race of said first bearing from moving axially toward said end of said inner tube;
removable means for preventing an outer race of said first bearing from moving axially toward the end of said outer cylindrical tube;
a second bearing interiorly of said outer tube and exteriorly of said inner tube, said second bearing being intermediate said first bearing and said end of said inner tube and the outer race of said second bearing being spaced from the outer race of said first bearing;
removable means for preventing an inner race of said second bearing from moving axially away from said end of said inner tube;

packing radially intermediate said inner and outer tubes adjacent said end of said inner tube; and means for axially compressing said packing to produce radial expansion sealing between said outer tube and an outer race of said second bearing, said axial compressing means being spaced from and not communicating with said inner race of said second bearing, said axial compressing means comprising:
- (a) a compression washer between said inner and outer tubes supportively communicating with the outer race of said second bearing and spaced from the inner race thereof;
- (b) a packing compression ring intermediate and in supportive contact with said compression washer and said packing;
- (c) a plurality of wedges on said packing compression ring extending towards said compression washer;
- (d) a plurality of wedge shaped cavities in said compression washer positioned to receive said wedges; and
- (e) at least one set screw in said outer tube positioned where an end thereof provides a generally tangential force against either said compression washer or said packing compression ring.

24. A rotating pipe coupling as in claim 23, wherein said set screw bears against said compression washer.

25. In a rotating union which comprises an outer cylindrical tube, an inner cylindrical tube having an end thereof coaxially entering, and surrounded by, the outer tube from an end thereof, packing radially intermediate said inner and outer tubes adjacent said end of said inner tube and bearing means mounting said inner tube to said outer tube, an improvement comprising using as said bearing means;

a first bearing interiorly of said outer tube and adjacent said end thereof, said first bearing being exterior of said inner tube;

means for attaching said first bearing to said inner and outer tubes for absorbing substantially all expansive axial forces imposed on said tubes;

a second bearing interiorly of said outer tube and exteriorly of said inner tube, said second bearing being intermediate said first bearing and said end of said inner tube; and means for attaching said second bearing to said inner and outer tubes for absorbing substantially only radial forces imposed on said tubes.

26. An improvement as in claim 25, including:

means for axially compressing said packing between said outer tube and said second bearing.

27. An improvement as in claim 26, wherein said axial compressing means are spaced from and are not in communication with said inner tube.

28. An improvement as in claim 26, wherein said axial compressing means comprises:

annular compression spring means surrounding said inner tube and within said outer tube.

29. An improvement as in claim 28, wherein said axial compressing means further comprises:

a compression washer between said inner and outer tubes in series with said spring means;

a packing compression ring abutting said compression washer; and means accessible from an exterior of said outer tube for axially adjusting the distance between the non-abutting ends of said packing compression ring and compression washer.

30. An improvement as in claim 26, including:

means for retarding rotation of said packing relative to said outer tube.

31. An improvement as in claim 26, wherein said axial compressing means comprises:

a compression washer between said inner and outer tubes;

a packing compression ring abutting with said compression washer; and means accessible from an exterior of said outer tube for axially adjusting the distance between the non-abutting ends of said packing compression ring and compression washer to adjust the compression of said packing.

* * * * *

UNITED STATES PATENT AND TRADEMARK OFFICE
CERTIFICATE OF CORRECTION

PATENT NO. : 4,366,973

DATED : January 4, 1983

INVENTOR(S) : Carroll E. Brekke

It is certified that error appears in the above-identified patent and that said Letters Patent is hereby corrected as shown below:

Column 8, line 9, "compression" should be "compressing"

Column 8, line 32, "rotating" should be "rotation"

Column 8, line 41, "compression" should be "compressing"

Column 8, line 67, "compression" should be "compressing"

Column 9, line 18, after "washer", "of" should be "or"

Column 11, line 27, "union" should be "pipe coupling"

Signed and Sealed this

Thirtieth Day of August 1983

[SEAL]

Attest:

GERALD J. MOSSINGHOFF

*Attesting Officer*  *Commissioner of Patents and Trademarks*